Figure 1:
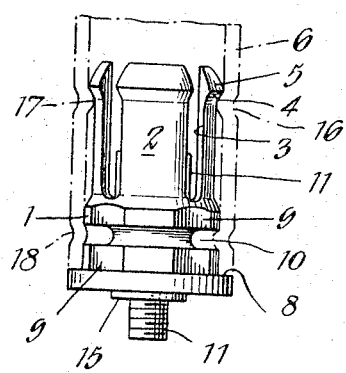

April 18, 1967  G. O. TAYLOR  3,314,699
CONNECTOR PIECES FOR TUBULAR ELEMENTS, TUBULAR STRUCTURES
INCORPORATING SUCH CONNECTOR PIECES AND
METHODS OF MAKING SUCH STRUCTURES
Filed July 16, 1964

Inventor
George Oswald Taylor
By Peck & Peck
Attorneys

United States Patent Office 3,314,699
Patented Apr. 18, 1967

3,314,699
CONNECTOR PIECES FOR TUBULAR ELEMENTS, TUBULAR STRUCTURES INCORPORATING SUCH CONNECTOR PIECES AND METHODS OF MAKING SUCH STRUCTURES
George O. Taylor, Guildford, England, assignor to The British Aluminium Company Limited, London, England, a British company
Filed July 16, 1964, Ser. No. 383,028
Claims priority, application Great Britain, July 19, 1963, 28,696/63
2 Claims. (Cl. 287—54)

This invention relates to improvements in connector pieces for tubular elements, tubular structures incorporating such connector pieces and methods of making such structures.

According to the present invention, a connector piece for a tubular element comprises a tube portion of resilient material having a split or slot extending from one end thereof intended to be inserted into the tubular element, means at or towards the other end of the tube portion for connection to a supporting member and an external shoulder at or adjacent to said one end for engagement with an internal shoulder of said tubular element to resist separation of the connector piece and the tubular element.

More particularly, the invention provides a connector piece for a tubular element comprising a tube portion of resilient material formed with one or more splits or slots extending from one end thereof intended for insertion into the tubular element, an external shoulder extending around the split end of the tube portion for engagement with an internal shoulder of the tubular element to resist separation of the connector piece and the tubular element, means at or towards the other end of the tube portion for connection to a supporting member and an external abutment surface spaced from the one end of the tube portion for engagement with the end of the tubular element to define the limit of insertion of the tube portion into the tubular element.

Conveniently, the tube portion is formed with an external annular groove at a location intermediate said abutment surface and the split end thereof to accommodate locking means such as, for example, material of the wall of the tubular element deformed inwardly into the annular groove permanently to connect the tube portion and the tubular element or a locking screw passing through the wall of the tubular element to effect a semi-permanent connection.

With advantage, the means for connecting the tube portion to the supporting member comprises a threaded member extending from the other end of the tube portion.

The invention also extends to a tubular element having a connector piece according to any one of the four immediately preceding paragraphs secured thereto.

The invention further extends to a method of making a tubular structure which comprises connecting to the supporting member a plurality of tubular elements having a connector piece secured thereto in accordance with the immediately preceding paragraph.

Figure 2:
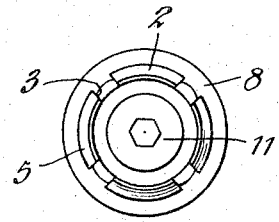
Figure 3:
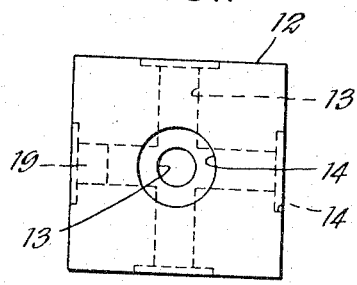
Figure 5:
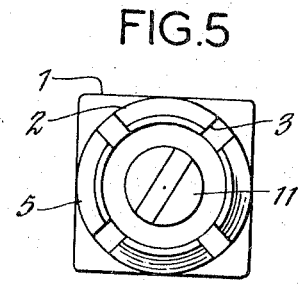
Figure 6:
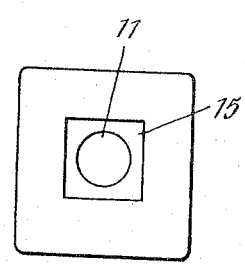
Figure 4:
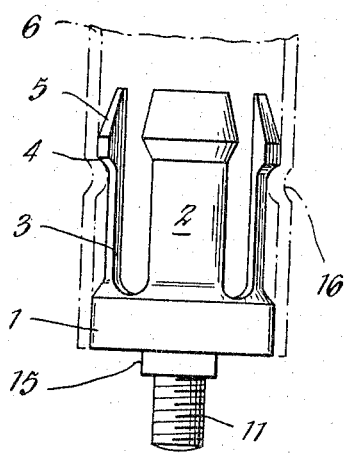

Some embodiments of the present invention will now be described by way of example, reference being made to the accompanying drawings in which:

FIG. 1 is an elevational view of a connector piece according to the invention with a tubular element shown in dotted lines attached thereto, FIG. 2 is a plan view of the connector piece of FIG. 1, FIG. 3 is an elevational view of a supporting member intended for attachment to the connector piece of FIG. 1, FIG. 4 is a view similar to FIG. 1 showing a modified form of connector piece, FIG. 5 is a plan view of the connector piece of FIG. 4, and FIG. 6 is an under-plan view of the connector piece of FIG. 4.

The connector piece of this example comprises a tube portion having a body part 1 from which extend a number of equi-angularly disposed tongues 2 extending parallel to the axis of the tube portion and formed by making equiangularly disposed parallel slots or channels 3 extending from the hollow leading end of the tube portion. In this example there are four slots or channels 3 and hence four tongues 2. The external diameter of tongues 2 is reduced from their roots to within a short distance of the leading edge thereof to form an external shoulder 4 (which is conveniently radiused) and to give the tongues a radial thickness selected in relation to the hardness of the material of the tube portion to provide a degree of resilience. From the shoulder 4 to their leading edge, the tongues 2 are bevelled externally as at 5 to facilitate their entry into a hollow tubular element 6. The external maximum diameter of the shoulder 4 and the external diameter of the body part 1 are substantially equal to or slightly smaller than the internal diameter of the tubular element 6. The body part 1, at its trailing end is formed with an enlarged diameter part providing an annular abutment surface 8 which limits the extent to which the connector piece can be inserted into the tubular element 6. The body part 1 is formed with flats 9 and also with an annular groove 10 intended to receive either a fixing screw (not shown) passing through the wall of the tubular element 6 to effect a semi-permanent connection or to receive part of the wall of the tubular element 6 deformed thereinto.

A bolt 11 extends through the body part 1 with its shank protruding from the trailing end thereof for engagement with a supporting member such as that indicated at 12 in FIG. 3. The supporting member 12 of this example is in the form of a cube having a threaded bore 13 extending from the centre of each face for engagement by a bolt 11 so that such a supporting member can have six connector pieces secured thereto. Each bore 13 extends from a circular recess 14 in the corresponding face, and the body part 1 of a connector piece is formed with a small boss 15 intended to be received in and located by a recess 14.

In use, a tubular element 6 is conveniently, but not necessarily, preformed with an external annular groove 16 to provide an internal annular rib 17 spaced from the leading end of the tubular element by a distance slightly less than the axial spacing between the abutment surface 8 and the shoulder 4. The leading ends of the tongues 2 of a connector piece are then inserted into the leading end of the tubular element and pushed home until the abutment surface 8 engages the mouth of the tubular element. The resilience of the tongues 2 enables them to be sprung inwardly as the bevelled edges ride over the internal rib 17 and the tongues then spring back to their unstressed condition with the shoulder 4 engaging the rib 17 and resisting withdrawal of the connector piece from the tubular element. It will be appreciated that the annular groove 16 may be formed after the connector piece is positioned in the tubular element 6. As the shoulder 4, in this example, is radiused, withdrawal of the connector piece is possible at this stage but, as will be appreciated, it may be made more difficult by omitting the radius and sharply stepping the shoulder 4. If a permanent connection is required, the wall of the tube 6 is deformed inwardly, as at 18 into the annular groove 10. For a semi-permanent connection, instead of deforming the wall of the element, a fixing screw (not shown) may be screwed therethrough to extend into the annular groove 10.

The combination of a connector piece and tubular element secured together provides a structural element a number of which may be connected together in any desired configuration by the use of suitable supporting members to form a sub-assembly for use in the construction of a tubular framework. The supporting member 12 shown in FIG. 3 may have up to six such structural elements threadedly engaged therewith. Any of the threaded bores 13 not in use may be closed by a button 19 (FIG. 3) of a suitable material, e.g., plastic, seated in the recess 14 with a spigot extending as a push fit or threadedly engaged within the associated bore.

As will be understood, the supporting member 12 may have any suitable shape and may have the bores 13 arranged therein in any desired pattern so that in a sub-assembly incorporating such a member 12, the structural elements may have any desired configuration.

It will be appreciated that the connector piece of the present invention may be used for making connections with tubular elements of a cross-section other than circular, e.g., rectangular. Such a connector piece is illustrated in FIGS. 4 to 6 and is similar in many respects to that illustrated in FIGS. 1 and 2 so that like reference numerals are used to denote like parts. In this case, the body part 1 of the connector piece is of square cross-section and is dimensioned to be received within the open end of a tubular element 6 of corresponding cross-section. The abutment surface 8 of the previous example is omitted but could be provided if desired in which case it would also be of square cross-section. The tube 6 has its walls dimpled or grooved as at 16 for engagement with the shoulders 4. Although the boss 15 could be of circular cross-section it is, in this example, of square cross-section, so that the recesses 14 in the supporting member 12 would have to be correspondingly shaped. This means that the connector piece cannot be turned relative to the member 12 when the square boss 15 is engaged in a recess 14 so that in order to assemble a structure, the square boss 15 of the connector piece has to be engaged in a recess 14 in the member 12 and the bolt 11 then screwed through the body part 1 into engagement with the bore 13 in the member 12. When a tubular element is then engaged with connector piece, it cannot be rotated with the connector piece to unscrew the bolt 11 from the bore 13 and the only way to detach the member 12 is to remove the tubular element 6 from the connector piece (if the shoulders 4 permit this) and unscrew the bolt 11.

It will be appreciated that the boss 15 in either of the above examples may be replaced by a corresponding shaped recess and the recess 14 in the member 12 replaced by a complementary boss.

I claim:
1. A connector piece assembly for a tubular element comprising a tube portion having a substantially closed rear end and an open front end, a plurality of slots extending from said front end to define a plurality of tongues the thickness of which is reduced from their roots to within a short distance of said front end to form an external shoulder on each tongue and to give each tongue a thickness in relation to the hardness of the material of the tube portion to provide a degree of resilience, each external shoulder being engageable with an internal shoulder of said tubular element to resist separation of the connector piece and the tubular element and the tongues being bevelled externally at their leading ends to facilitate insertion into the tubular element, an external annular groove formed adjacent to said rear end to accommodate locking means, an abutment extending rearwardly from said rear end and a threaded member extending through said rear end and said abutment and rearwardly of said abutment, and said connector piece including a supporting connector member having a plurality of threaded bores and having said threaded member engaged in one of said bores and complementary projection and recess formations formed on said connector piece and supporting member adjacent said threaded bores.

2. The combination according to claim 1 wherein said complementary projection and recess formations each comprise a boss formed on said abutment to extend rearwardly thereof with said threaded member extending therethrough and an annular recess in said supporting member surrounding a threaded bore.

References Cited by the Examiner
UNITED STATES PATENTS

| | | | |
|---|---|---|---|
| 367,578 | 8/1887 | Babb | 287—126 X |
| 1,272,678 | 7/1918 | Kroll. | |
| 1,380,041 | 5/1921 | Cook | 287—20 X |
| 1,817,775 | 8/1931 | Sipe | 287—54 X |

FOREIGN PATENTS

| | | |
|---|---|---|
| 745,688 | 2/1933 | France. |
| 639,809 | 7/1950 | Great Britain. |
| 530,415 | 7/1955 | Italy. |

CARL W. TOMLIN, *Primary Examiner.*

A. V. KUNDRAT, *Assistant Examiner.*